(No Model.)

C. F. A. EDDY.
EGG CARRIER.

No. 401,645. Patented Apr. 16, 1889.

Witnesses:
John Enders
Paul W. Stevens

Inventor:
Charles F. A. Eddy
per Ayers & Co.
Attorney.

UNITED STATES PATENT OFFICE.

CHARLES F. A. EDDY, OF GREENFIELD, MASSACHUSETTS.

EGG-CARRIER.

SPECIFICATION forming part of Letters Patent No. 401,645, dated April 16, 1889.

Application filed February 9, 1889. Serial No. 299,255. (No model.)

*To all whom it may concern:*

Be it known that I, CHARLES F. A. EDDY, a citizen of the United States of America, residing at Greenfield, in the county of Franklin and State of Massachusetts, have invented certain new and useful Improvements in Egg-Carriers, of which the following is a specification, reference being had therein to the accompanying drawings.

This invention is directed to certain improvements in egg-carriers, having for its object to simplify construction and promote cheapness, and a more practicable device for securely holding and protecting eggs while in transshipment.

To these ends the nature of the invention consists in the detailed construction of the parts, as will be more fully understood from the following description and the accompanying drawings, in which—

Figure 1:
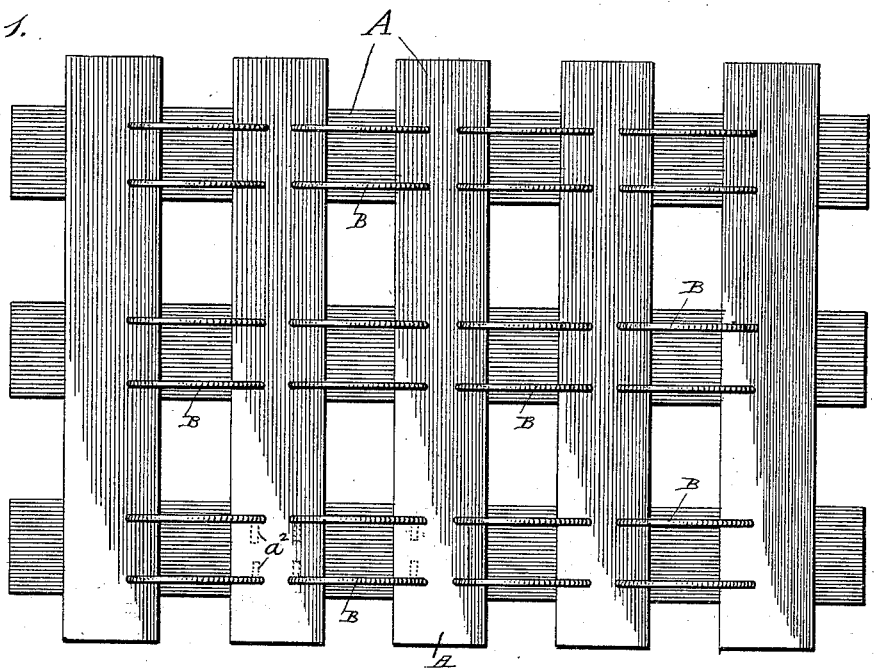
Figure 2:
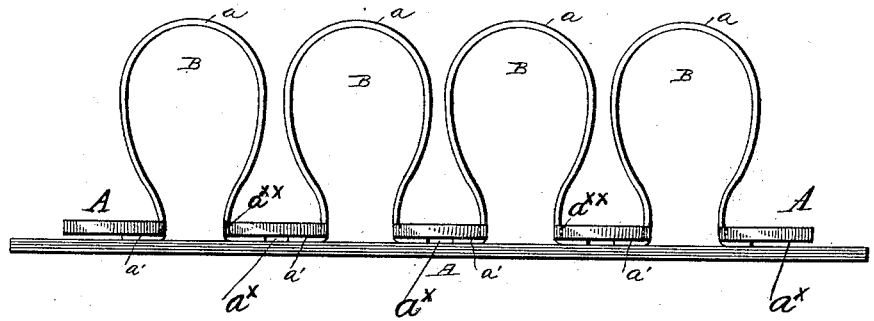
Figure 3:
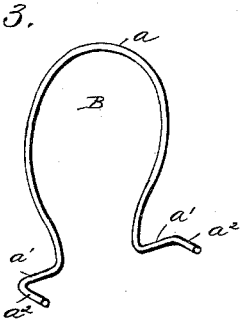

Figure 1 is a plan view of my improved egg-carrier. Fig. 2 is a side view thereof, and Fig. 3 is a detached perspective view of one of the carriers proper.

In the embodiment of my invention I employ a reticulated frame, A, to which I apply rows or series of holders or carriers proper, B, for the retention in place of the eggs in the shipment of the same in boxes. The crossing bars or slats of the frame A, it will be observed by reference to Fig. 2, are slightly spaced apart, as at $a^x$, while the upper bars or slats are notched, $a^{xx} a^{xx}$, the purpose of which will appear farther on.

Each holder or carrier is formed of two wires, each of which is formed into a loop, $a$, adapted to the contour of the egg in cross-section it is designed to receive. The ends of each looped portion $a$ of the carrier or holder B are first extended outward from the loop horizontally, as at $a'$, a short distance into arms, and then extended laterally at right angles to said arms, as at $a^2$. By this construction arms are provided for supporting or resting the holders or carriers upon the frame in an upright position, as also for securing said arms in position against displacement, the lateral extensions or portions being inserted or wedged in the spaces $a^x a^x$ between the crossing-slats of the frame A to effect this latter result. To aid in securing this result, the lower contracted portions of the loops $a$ of the wires B are let into the notches $a^{xx} a^{xx}$ of the upper slats or bars of the frame A.

It will thus be seen that an exceedingly simple and substantial egg-carrier is produced which is formed of two wires and applied to the base or frame without additional fastenings, and without having to be let into the wood or frame, and can be readily or quickly applied to and removed from the base or frame. The carriers also form a very sensitive spring-clamp which holds the egg firmly and prevents breakage from jar and concussion, and does not permit the egg to come in contact with the base.

Having thus fully described my invention, what I claim, and desire to secure by Letters Patent, is—

1. The egg-carrier consisting of the reticulated frame or base and the holders or carriers proper extended outward into arms, said arms having lateral extensions which are interposed between the crossing-pieces of the frame or base, substantially as set forth.

2. The egg-carrier having series or rows of holders or carriers proper, each consisting of two continuous wires formed into loops having outward-extended arms provided with lateral extensions, substantially as set forth.

In testimony whereof I affix my signature in presence of witnesses.

CHARLES F. A. EDDY.

Witnesses:
 AUSTIN DEWOLF,
 FRANKLIN G. FESSENDEN.